March 9, 1943.  A. LAMESCH  2,313,296

FIBER OR FILAMENT OF GLASS

Filed Sept. 23, 1937

Inventor:
Armand Lamesch
by Owen & Owen

Patented Mar. 9, 1943

2,313,296

UNITED STATES PATENT OFFICE 2,313,296

FIBER OR FILAMENT OF GLASS

Armand Lamesch, Herzogenrath, near Aachen, Germany; vested in the Alien Property Custodian Application September 23, 1937, Serial No. 165,369
In Germany September 30, 1936

6 Claims. (Cl. 49—92)

The invention relates to fibers or filaments of glass or like substances capable of being spun when in a molten condition and has for its main object to provide improved fibers or filaments of this kind having properties which render them particularly suitable for use in making, for example, glass wool, insulating wadding, threads, or the like. A further object of the invention is to provide a method of producing such fibers or filaments.

It has already been proposed to produce solid filaments of glass by drawing glass rods or glass drops issuing from openings in a furnace, or by centrifuging liquid glass on a revolving disc, but such filaments have the disadvantage that their capacity for resisting stresses, and particularly bending stresses, is very small, since glass can endure high compressive stresses but only slow tensile stresses. This disadvantage is apparent when the filaments, are subjected to strong bending stresses, and also when using structures made from glass filaments. By means of the invention, a glass filament, which is formed with the aid of heat, is obtained which obviates the disadvantages of the hitherto known filaments and at the same time has other favourable properties, which will be explained hereinafter, and makes it particularly suitable for certain purposes.

According to the invention the glass fibers or filaments comprise concentrically disposed interfused glass layers of different composition.

Preferably each fiber or filament consists of a glass core fused with an outer layer or shell of glass having a different coefficient of expansion from that of the glass core. The effect of this combination is that during cooling the tendency of the core to contract to a degree different from that of the shell causes the latter to assume a different condition of tension from that which it would have assumed without this influence.

If the coefficient of expansion of the core is greater than that of the shell, the core is subjected to tensile stresses and the shell to compressive stresses when the filament is cold; that is, the filament has the same properties which are produced in glass articles in known manner by means of the so-called hardening process.

A filament constructed in such a manner possesses considerably improved physical and mechanical properties as compared with ordinary glass filaments; above all, it breaks less easily and can be deformed to a much greater extent.

It will be understood that for certain purposes it may be desirable to produce filaments in which the core is under compressive stresses and the shell is under tensile stresses; that is, the opposite of the form described above. Such filaments are produced by using for the core a glass having a smaller coefficient of expansion than that used for the shell.

Irrespective of whether the shell or the core is subjected to the compressive stresses, the filamentments according to the invention have the favourable property that they can be heated up to such temperatures at which the glass expands and, nevertheless, again take up their former condition with regard to the tensional difference between the shell and the core after cooling.

This property makes it possible for such filaments to be produced in a comparatively simple manner by heat deformation without it being necessary to cool the surfaces thereof suddenly, as is essential in the known glass hardening processes.

Three particular methods of making glass filaments or fibers according to the invention will now be described, by way of example with reference to the accompanying drawing.

Figure 1:
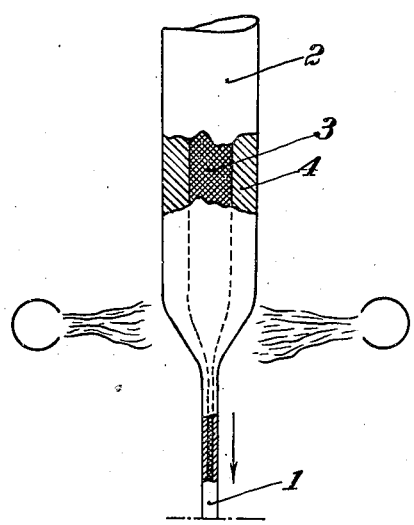
Fig. 1 is a side view, partly in section, of a composite glass rod being drawn into a filament.

According to the method shown in Figure 1, the filament 1 is drawn from a composite glass rod 2 comprising a core 3 and a concentric outer layer or shell 4 of different types of glass, for example, the core 3 thereof may have a greater coefficient of expansion than the shell 4.

In order to spin the filament, the end of the rod 2 is brought into a molten condition in known manner whereupon the separate elements 3 and 4 become fused together, and is then drawn. The filament thus obtained has the same concentric arrangement of the components as the initial composite rod with the layers in the same relative proportions of thickness as they were in said rod.

Figure 3:
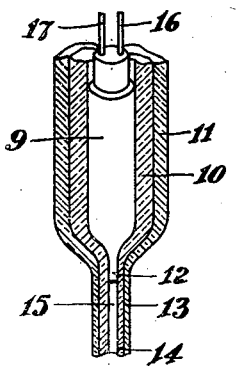
Fig. 3 is a detail view, partly in section, of another form of filament.

In the example shown in Figure 1, two types of glass are fused together, but it will be obvious that instead of this, a combination of two independent glass bodies arranged concentrically to one another, with or without a gap, may also be used. The central portion may be made solid or may be of tubular shape. In the latter case a heating device may be fitted within the whole, as shown at 9 in Fig. 3, and with the aid of which the temperature and the fusion of the ends of the two glass bodies may be regulated. An inner tube 10 and outer concentric tube 11 may be moved down past the heating device 9 and softened and drawn past the reduced end 12 to form a filament composed of an outer tube 13 of one kind of glass drawn from tube 11 and an inner tube 14 of different glass drawn from tube 10 and having a tubular opening 15 therethrough. External heat, as shown in Fig. 1, may be used or not as desired. Heating member 9 may be of any desired character, but is diagrammatically indicated as an electric heater supplied with current by leads 16 and 17. It will be seen that it is readily possible in this manner to produce a filament of tubular form which offers advantages under certain circumstances. Hollow glass filaments are of course known per se and do not form the subject of this invention.

Figure 2:
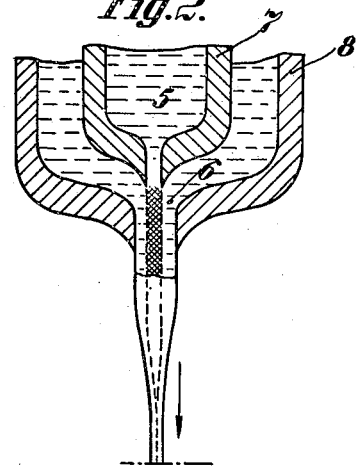
Fig. 2 is a view also partly in section of a similar filament being drawn from bodies of molten glass.

According to the method illustrated in Figure 2 two different types of glass are permitted to emerge from nozzles 5 and 6 of two different containers or melting vessels 7 and 8 arranged concentrically one within the other. As will be clearly understood from the drawing, the two glasses of different coefficients of expansion are united to form the final filament.

Although the above described methods of making the filament have been found suitable it will be understood that the invention is not limited to these three methods of manufacture, which have been given by way of example, but other methods may be employed without departing from the scope of the invention. Moreover, the filament may be constructed as a solid filament or, in the manner as briefly mentioned when explaining the first of the methods of production, as a hollow filament. When the filaments comprise more than two layers, the characteristic of the invention is fulfilled by at least one of the core layers having a different composition, such as, for example, a different coefficient of expansion, from at least one of the shell layers.

What I claim and desire to secure by Letters Patent is:

1. A flexible filament of glass comprising concentrically disposed inter-fused glass layers of different compositions.

2. A glass filament comprising a flexible glass core, an outer shell of glass surrounding said core and having a coefficient of expansion different from that of said glass core, said glass core and outer glass shell being inter-fused.

3. A glass filament comprising a flexible glass core surrounded by an outer glass layer, the core and layer being inter-fused, said glass core having a greater thermal coefficient of expansion than said outer glass layer whereby, at normal temperatures, the glass core is subjected to tensile stresses and the outer glass layer is subjected to compressive stresses.

4. A glass filament comprising a flexible glass core surrounded by an outer glass shell, the core and layer being inter-fused, said glass core having a lower thermal coefficient of expansion than the said outer glass shell whereby, at normal temperatures, said glass core is subjected to compressive stresses and said outer shell is subjected to tensile stresses.

5. A flexible glass filament comprising two inter-fused concentric tubular glass elements having different coefficients of expansion.

6. A flexible glass filament comprising a glass core, a tubular glass shell enclosing said glass core and fused therewith, said glass core and glass shell having different coefficients of expansion.

ARMAND LAMESCH.